Feb. 10, 1953   E. M. WILLIAMS   2,628,330
CONDENSER-CHARGING SYSTEM FOR SPARK-CUTTING DEVICES
Filed Nov. 14, 1951
Fig.1.
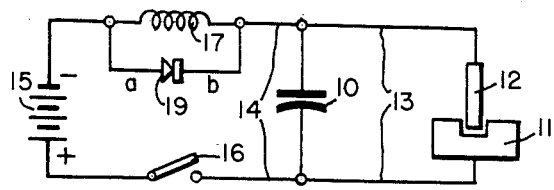
Fig.2.
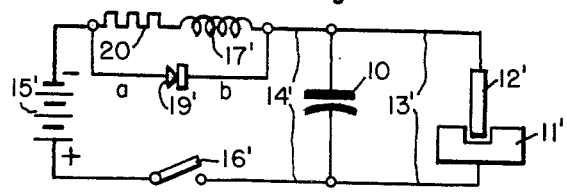
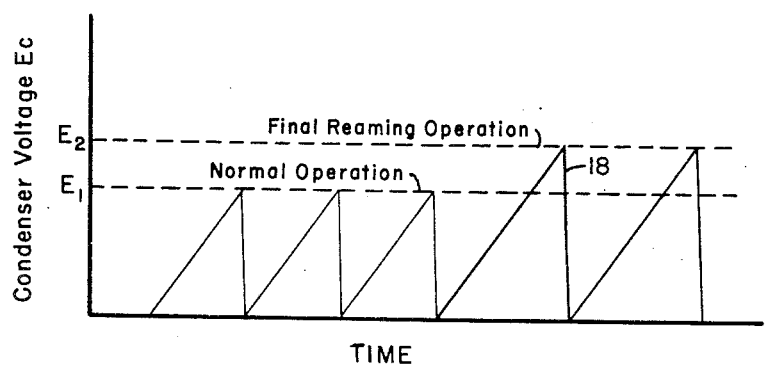
Fig.3.
INVENTOR
Everard M. Williams.
BY
HIS ATTORNEYS

Patented Feb. 10, 1953

2,628,330

UNITED STATES PATENT OFFICE 2,628,330

CONDENSER-CHARGING SYSTEM FOR SPARK-CUTTING DEVICES

Everard M. Williams, Pittsburgh, Pa., assignor to The Method X Company, Lansdale, Pa.

Application November 14, 1951, Serial No. 256,323

7 Claims. (Cl. 315—200)

This invention relates generally to apparatus for the cutting of hard materials by a succession of spark discharges produced between an electrode and a workpiece by a condenser and, in particular, to a circuit for charging the storage condenser between successive discharges.

In application Serial No. 202,361, filed December 22, 1950 now pending in the name of Edmund E. Teubner, there is disclosed a spark-cutting system including a condenser connected across the work-circuit, i. e., an electrode and the workpiece, and a circuit for charging the condenser including an inductor and a direct-current source. When the condenser is charged by the source to a voltage equal to the breakdown value of the insulating medium between the electrode and workpiece, a spark discharge occurs which erodes a small portion of the latter. Successive charging and discharging operations continue so long as the spark gap between the electrode and workpiece is small enough to permit breakdown of the insulating medium by the maximum voltage to which the condenser is charged by the source. This requires more or less constant re-adjustment of the gap spacing as the erosion progresses, which may be accomplished conveniently by advancing the electrode toward the workpiece.

The presence of the inductor in the charging circuit as compared with the presence of a resistance in the charging circuit, while advantageous from the standpoint of decreasing the charging time and therefore increasing the frequency of the discharge and the rate of cutting, also presents a disadvantage. Under some conditions of operation, particularly during end reaming of cuts, it is difficult to keep the electrode advancing sufficiently between sparks to maintain the gap below the critical or breakdown value. When this occurs, the energy stored in the inductor causes the condenser to be charged to a voltage considerably higher than that of the source. That is to say, as the charging current decays, the inductor acts in a manner to maintain the current, as a result of the collapse of magnetic lines of force linking the turns of the inductor, analogous to the inductive "kick" occurring on opening the field circuit of a D. C. machine, and this excess voltage increases the condenser charge and appears across the condenser terminals. This excess voltage existing on the condenser is objectionable since it will cause erratic machining or erosion at a gap spacing greater than that which will be broken down by the normal peak voltage, i. e., that of the supply source.

I have invented a novel charging circuit for the condenser of a spark-cutting apparatus, whereby the foregoing objection is overcome. In a preferred embodiment, I provide means for preventing excess voltage from accumulating on the condenser. More specifically, I employ unidirectional conducting means for shunting the inductor so that the excess voltage appearing on decay of the charging current is harmlessly dissipated. Such unidirectional conducting means may conveniently be a contact type of rectifier. Since it conducts little or no current in the reverse direction, the normal functioning of the inductor in the charging circuit is substantially unaffected.

A complete understanding of the invention may be obtained from the following detailed description and explanation which refer to the accompanying drawing illustrating the present preferred embodiment. In the drawings, Figure 1 is a diagram showing the work or discharge circuit, the storage condenser and a charging circuit therefor in accordance with my invention;

Figure 2 is a similar diagram showing a modification; and

Figure 3 is a graph of condenser voltage showing the condition which it is the object of the invention to overcome.

Referring now in detail to the drawings and, for the present to Figure 1 a storage condenser 10 is adapted to cause a spark discharge between a workpiece 11 and an electrode 12 adjacent thereto, comprising the discharge circuit 13, which will effect erosion of the former, when the condenser voltage is sufficient to break down the insulating medium in the gap between the electrode and workpiece, usually kerosene or transformer oil. Means (not shown) are provided for advancing the electrode toward the workpiece as the cutting proceeds. For charging the condenser, a circuit 14 is connected thereto, including a direct-current source 15, a switch 16, and an inductor 17. As shown, the positive terminal of the source is connected to the condenser terminal which is connected to the workpiece. The operation of the system disclosed so far, as explained in the co-pending application referred to above, is shown graphically in Figure 3.

On closing switch 16, the condenser voltage $E_c$ builds up rapidly from zero as the condenser is charged and soon reaches a maximum value $E_1$ which is the voltage of source 15. If the gap between the electrode and workpiece is properly adjusted, a discharge of the condenser will then occur, manifested by sparking at the gap. As a result of the discharge, the condenser voltage falls directly to zero and the spark gap is then deionized. Recharging of the condenser starts immediately and a second spark discharge follows when voltage $E_1$ is again reached. Thus the normal cutting operation is effected by a continuous repetition of the cycle described, the electrode being adjusted as necessitated by the erosion of the workpiece, to maintain the spark gap at the critical distance, i. e., that at which voltage $E_1$ will break down the insulation.

When conducting a final or end reaming operation, the gap adjustment may not be made rapidly enough, as already explained, leaving the gap greater than the critical distance. This means that, instead of repeating the spark discharge, the continuous cycle of recharging and discharging will be interrupted and, as the final charging current ceases, the inductive "kick" from inductor 17 will throw a supra-normal bulge 18 into the voltage curve and the voltage $E_2$ would cause abnormal operation, were it not for the preventive means which I provide as will now be explained.

Referring again to Figure 1, I connect a unidirectional conducting device 19 across the inductor 17 in such manner that the voltage of source 15 will not cause current to flow therethrough. That is to say, normal condenser-charging current flowing from right to left through the inductor will not be accompanied by any current flow through device 19 because the voltage at terminal $b$ thereof will be higher than that at terminal $a$ by the IZ drop in the inductor, whereas the device conducts only in the direction $a \rightarrow b$. The device 19 is preferably a contact rectifier (barrier layer) of the copper-oxide or selenium-iron type. Now when the condenser-charging current tends to decrease following charging of the condenser to the voltage of the source 15, inductor 17 tends to keep it flowing, acting temporarily as a generator in additive series with the source 15, and the voltage at terminal $a$ of rectifier 19 starts to rise above that at terminal $b$. Since the rectifier conducts in the direction from left to right, current flows in the local circuit including the rectifier and inductor, thereby dissipating the energy stored in the magnetic field of the inductor and preventing it from building up voltage on the condenser 10 in addition to that of source 15. Thus the maximum condenser voltage is maintained at $E_1$ in spite of the presence of the inductor, and normal operation of the spark-cutting apparatus is assured, whether or not the gap is adjusted rapidly to the critical value. That is, should the gap exceed the critical value, the only result will be that no further spark discharges will occur until it is reduced to that value.

Figure 2 shows a modification in which the charging circuit 14' includes a resistor 20 in addition to the other elements of circuit 14. It will be understood that this changes the time constant of the circuit 14' from that of circuit 14 but the operation is otherwise unaffected. Rectifier 19 is connected across both the resistor and inductor so both will be effective in dissipating the voltage induced in the latter on termination of the charging current.

It will be apparent from the foregoing that the invention provides a simple inexpensive means, entirely automatic in operation, for avoiding the erratic functioning of spark-cutting apparatus which would otherwise be caused by the inductive kick appearing across the terminals of the inductor at the end of the charging stage of the operating cycle, when the spark-gap spacing is too great to permit a further discharge of the condenser.

Although I have illustrated and described only a preferred embodiment with a slight modification, it is my intention to include within the scope of the following claims any changes which do not involve a departure from the spirit of my invention.

I claim:

1. In a spark-cutting system, a storage condenser adapted to discharge when an electrode and a workpiece connected thereacross are separated by an insulating medium but so spaced that the condenser voltage exceeds the breakdown value of the insulating medium, a circuit for charging said condenser comprising a direct-current source and an inductor in series therewith and a unidirectional conducting device connected across said inductor in a relation such that it will not conduct current as a result of the voltage of said source.

2. In a spark-cutting system, a storage condenser adapted to discharge when an electrode and a workpiece connected thereacross are separated by an insulating medium but so spaced that the condenser voltage exceeds the breakdown value of the insulating medium, a circuit for charging said condenser comprising a direct-current source and an inductor in series therewith and means connected across said inductor permitting current flow only as a result of the inductive voltage appearing thereacross on termination of condenser-charging current.

3. The invention as defined by claim 2 characterized by said means being a rectifier.

4. The invention as defined by claim 1 characterized by said device being a contact-type rectifier.

5. The invention as defined by claim 1 characterized by said charging circuit including also a resistor in series with said inductor, said device being connected across both said resistor and said inductor.

6. A charging circuit for the condenser of a spark-cutting system comprising a direct-current source and an inductor connected in series with the condenser, and a rectifier connected across said inductor so as to be non-conducting in the direction of condenser-charging current.

7. A charging circuit for the condenser of a spark-cutting system comprising a direct-current source, an inductor and a resistor connected in series with the condenser, and a rectifier connected across both the inductor and resistor so as to be non-conducting in the direction of condenser-charging current.

EVERARD M. WILLIAMS.

No references cited.